United States Patent
Williams

[19]

[11] Patent Number: 5,881,271
[45] Date of Patent: Mar. 9, 1999

[54] SYSTEM AND METHOD FOR CLOCK MANAGEMENT

[75] Inventor: Mark Williams, San Jose, Calif.

[73] Assignee: OPTi Inc., Milpitas, Calif.

[21] Appl. No.: 775,171

[22] Filed: Dec. 31, 1996

[51] Int. Cl.$^6$ .................................................. G06F 1/12
[52] U.S. Cl. ........................................ 395/552; 395/560
[58] Field of Search .................................. 395/551, 552, 395/560, 556

[56] References Cited

U.S. PATENT DOCUMENTS

| | | | |
|---|---|---|---|
| 5,274,796 | 12/1993 | Conner ...................................... | 395/551 |
| 5,293,626 | 3/1994 | Priest et al. .............................. | 395/552 |
| 5,455,935 | 10/1995 | Taylor et al. ............................ | 395/552 |
| 5,572,722 | 11/1996 | Vogley ................................. | 395/551 X |
| 5,625,807 | 4/1997 | Lee et al. ................................. | 395/560 |
| 5,692,165 | 11/1997 | Jeddeloh et al. ........................ | 395/551 |

*Primary Examiner*—Thomas M. Heckler
*Attorney, Agent, or Firm*—Fliesler Dubb Meyer & Lovejoy LLP

[57] ABSTRACT

A system in accordance with the invention comprises a first clock input for carrying a clock input signal having first clock cycles, a clock output for carrying an output clock signal having cycles which are synchronous with the first clock cycles, and programmable delay means. Programmable delay means receives the clock input signal, and generates the output clock signal which is delayed from the input by at least a programmable delay and where the programmable delay causes the output clock signal to be synchronous with the input clock signal.

11 Claims, 2 Drawing Sheets

SYSTEM AND METHOD FOR CLOCK MANAGEMENT

BACKGROUND OF THE INVENTION

1. Field of the Invention

The invention relates to clock management in computer systems, and particularly to the management of clock signals to PCI devices.

2. Background Art

The IBM PC AT computer architecture has become industry standard architecture for personal computers, and is typically built around a CPU such as an 80286, 80386, 80486, or 80586 (Pentium®) microprocessor all manufactured by Intel Corporation. The CPU is coupled to a host (local) bus, capable of performing memory accesses and data transfers at high rates of speed (i.e., on the order of 10–66 MHz). The host bus generally includes 16, 32, or 64 data lines, a plurality of address lines, and various control/status lines.

The typical IBM PC AT-compatible computer also includes a system bus, sometimes referred to as an I/O bus. Such a system bus is used to interface communications between a host CPU and a peripheral device, or communications between peripheral devices and host memory. The system bus is coupled to the host bus via certain interface circuitry. The system bus includes generally 8, 16, or 32 data lines, a plurality of address lines, as well as control/status lines.

One commonly used system bus is the PCI bus. The PCI bus has been developed to establish an industry standard for system bus architectures, particularly those interfacing with high bandwidth functions. The PCI bus is described in detail in "PCI Local Bus Specification", Revision 2.1 (Portland, Oreg., PCI Special Interest Group, 1995), incorporated by reference herein.

The PCI specification, Revision 2.1 (herein referred to as "PCI 2.1") requires that each device on the PCI bus receive its own clock signal. Thus, there can be no clock sharing, and the computer system circuitry must generate multiple PCI clocks. PCI 2.1 further requires that the clock signal to each PCI device be synchronous (or in phase) with each of the clocks generated to each of the other PCI devices. To be considered in phase, PCI 2.1 requires that each clock have no more than a 2 ns skew from all other clocks generated to PCI devices.

Moreover, many system functions require that each PCI clock be in phase (within predefined tolerance limits) with the CPU clock, that is, the CPU clock and each of the PCI clocks must be synchronous. In a synchronous mode of operation, devices sample certain signals on the rising (or falling) edge, of the clock. If clocks are too far out of phase, then sampled signals may be incorrect or sampled at an incorrect time.

Generally, a clock generator will generate both a CPU clock signal and a PCI clock signal. PCI bus interface circuitry will receive the PCI clock signal and buffer it to obtain the multiple PCI clocks required for each device on the PCI bus. Often, however, because of the buffering to obtain multiple PCI clocks, as well as any additional buffering of the CPU clock, obtaining each of these clocks in phase (e.g., within 2 ns) can be difficult.

In addition, PCI 2.1 specifies the implementation of a CLKRUN# signal, which is an optional signal used to stop clock signals to devices, allowing a system to consume less power in certain states of inactivity. When a host or PCI bus controller drives CLKRUN# high, a PCI device still requiring a clock must pull the CLKRUN# signal low within four clock cycles. If no device pulls CLKRUN# low, the host will stop the clocks to all PCI devices. Many PCI devices, however, do not support the optional CLKRUN# signal and require a clock to run at all times.

Also in recent years, and particularly with the growing popularity of notebook computers, efforts have been made to reduce the size and improve the manufacturability of PC AT-compatible computers. Specifically, several manufacturers have developed "chipsets", which integrate a large amount of the system interface circuitry and other circuitry onto only a few chips. Examples of a chipset used in a notebook computer is Viper-N™ produced by OPTi, Inc. of Milpitas, Calif. The interface circuitry integrated into chipsets often includes interface circuitry between the host bus and the ISA bus and/or the PCI bus. In efforts to reduce system hardware, as many computer system functions as possible are sought to be incorporated into a chipset.

Therefore, it is desirable to develop a computer system that not only minimizes clock skew in clocks provided to PCI devices, but also fully supports devices that can implement CLKRUN# and those that do not. Further, it is desirable to incorporate those clock management functions along with many other interface functions into a chipset to minimize computer system hardware.

SUMMARY OF THE INVENTION

In order to alleviate problems with clock skewing, a system in accordance with the invention comprises a first clock input, a clock output, and programmable delay means. The first clock input carries a clock input signal having first clock cycles. The clock output carries an output clock signal having cycles which are synchronous with the first clock cycles. The programmable delay means is for receiving the input clock signal and for generating the output clock signal, which is delayed from the input clock signal by at least a programmable delay. The programmable delay causes the output clock signal to be synchronous with the input clock signal.

A system in accordance with the invention is advantageous in that it can be used to generate PCI clock signals which are required to be synchronous with each other by PCI 2.1.

A system in accordance with the invention is further advantageous in that it is useful in producing multiple clock signals which are synchronous with a processor clock.

A further advantage of a system in accordance with the invention is that it can be incorporated into a chipset, reducing extraneous circuitry in a computer system.

Further, in some embodiments, a system in accordance with the invention further includes a CLKRUN# input for receiving a CLKRUN# or other polling signal and means for selectively blocking the output clock signal in response to the CLKRUN# signal. Such a system is further advantageous in that it can fully accommodate devices that support a PCI CLKRUN# scheme and those that do not support such a CLKRUN# scheme.

BRIEF DESCRIPTION OF THE DRAWINGS

The present invention is described with respect to particular exemplary embodiments thereof and reference is accordingly made to the drawings (which are not necessarily drawn to scale), wherein like reference numbers denote like parts, in which.

DETAILED DESCRIPTION

Figure 1:
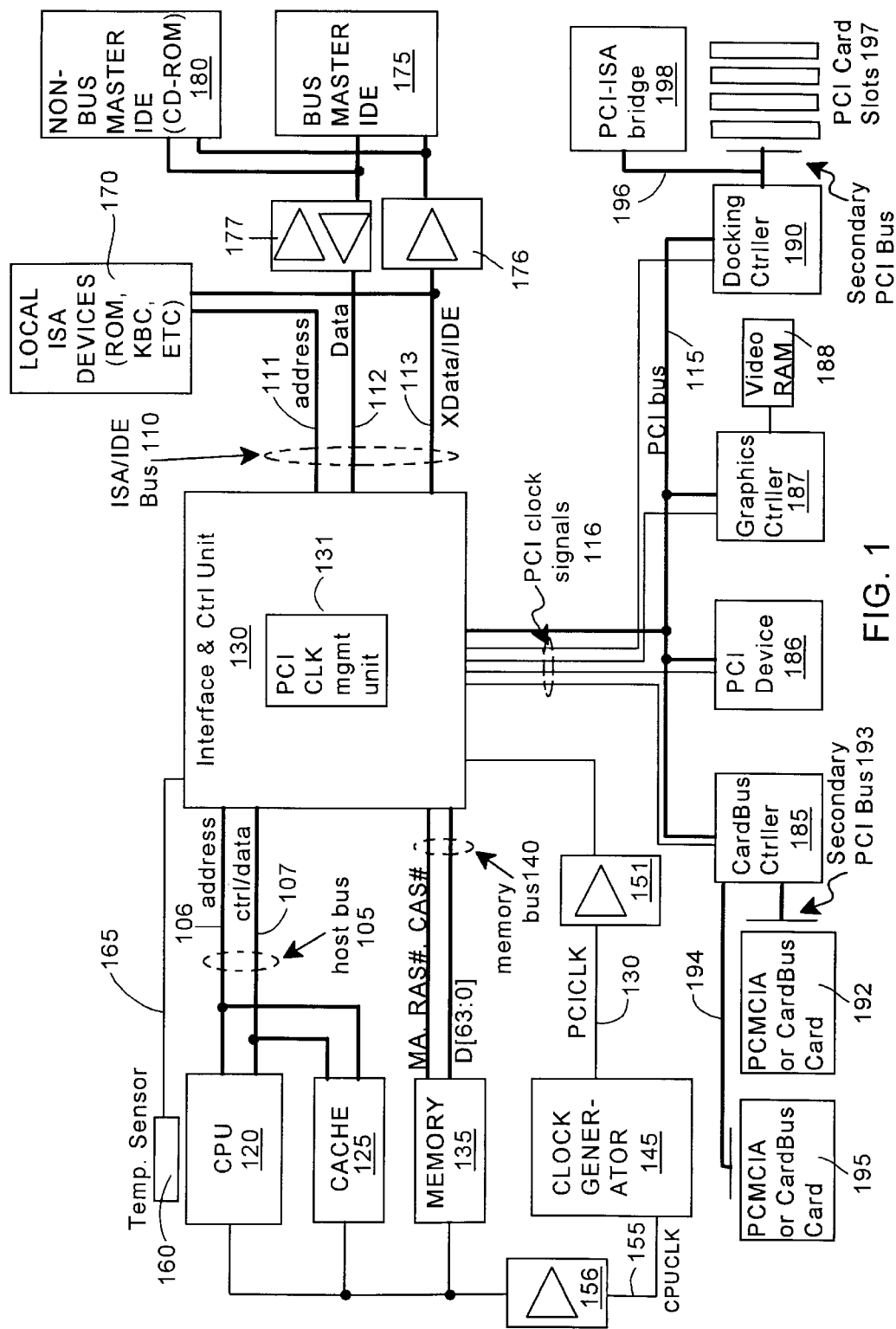
FIG. 1 is a schematic block diagram of a system which utilizes an embodiment of the invention.

A system 100 which may incorporate the present invention is shown in FIG. 1. It comprises a host bus 105, an ISA bus 110, and a primary PCI bus 115.

The host bus 105 includes address lines 106 and control/data/status lines 107. The ISA bus 110 includes address lines 111, 16-bit data lines 112, XData lines 113, as well as various control/status lines (not shown). The primary PCI bus 115, includes address, data and control/status lines.

A processor 120 (such as Intel's 80586 Pentium®) is coupled to address, data and control/status lines of host bus 105. The address and control lines of host bus 105 is further coupled to cache memory 125. Cache memory 125 may be synchronous L2 (level 2) cache in one embodiment.

Host bus 105 is further coupled to interface and control unit 130. In one embodiment interface and control unit 130 is a chipset. Interface and control unit 130 includes clock management unit 131.

Interface and control unit 130 is coupled to memory unit 135 via memory bus 140 which provides memory address, RAS#, CAS#, and data information between interface and control unit 130 and memory unit 135. Memory unit 135 may be composed of EDO or synchronous DRAM in various embodiments.

Clock generator unit 145 provides a PCI clock signal (PCICLK) on line 150 via buffer 151 to interface and control unit 130. Clock generator unit 145 further provides a processor clock signal (CPUCLK) on line 155 via buffer 156 to memory unit 135 (if synchronous DRAM is used) and to processor 120.

Temperature sensor circuit 160 is coupled to interface and control unit 130 via line 165.

Several devices are coupled to interface and control unit 130 via ISA bus 110. These devices include local ISA devices 170, such as BIOS ROM, keyboard controller (KBC), etc. Further, bus mastering IDE devices 175 as well as IDEs 180 which are incapable of a bus-master mode of operation (such as CD-ROM drives) are coupled to interface and control unit via ISA bus 110, buffer 176 and bidirectional transceiver 177.

PCI bus 115 is also coupled to interface and control unit 130. Several devices are coupled to PCI bus 115, including a cardbus controller 185, which may be an 82C824 produced by OPTi, Inc. of Milpitas, Calif., a graphics controller 187, which may be a 92C178, produced by OPTi, Inc., and a docking controller 190, which may be an 82C814 produced by OPTi, Inc. Coupled to graphics controller 187 is video RAM card 188. Other PCI devices 186, such as a PCI-based super I/O unit, may also be coupled to PCI bus 115. Other embodiments may utilize different PCI devices from those of FIG. 1.

CardBus controller 185 acts as a bridge to secondary PCI buses 193 and 194. Secondary PCI buses 193 and 194 couple PCMCIA or other CardBus cards 192 and 195 to the system.

In like manner, docking controller 190 is coupled to a secondary PCI bus 196, which couples additional PCI slots 197 to the system. In one embodiment of the invention, docking controller 190 is further coupled to a PCI-to-ISA bridge 198.

Also shown in FIG. 1 are PCI clock signals 116. Although shown separate, PCI signal lines 116 may be considered part of PCI bus 115, and are shown separately for demonstrative purposes only. PCI 2.1 requires that each PCI device on a PCI bus receive a single and unshared clock signal that has no more than 2 ns skew from other PCI clocks. Further, many host-PCI interfaces and/or chipsets operate in synchronous modes, requiring that PCI clocks be in phase (within a predefined tolerance) with the CPU clock. If not in phase, and the device is operating in a synchronous mode, data may be sampled at inappropriate times leading to system errors.

To provide multiple PCI clocks, conventionally, one PCI clock is generated by a clock generator and usually buffered to provide multiple clocks. However, buffering the PCI clock, creates skew between the clocks, making it difficult to keep these clocks in phase.

Figure 2:
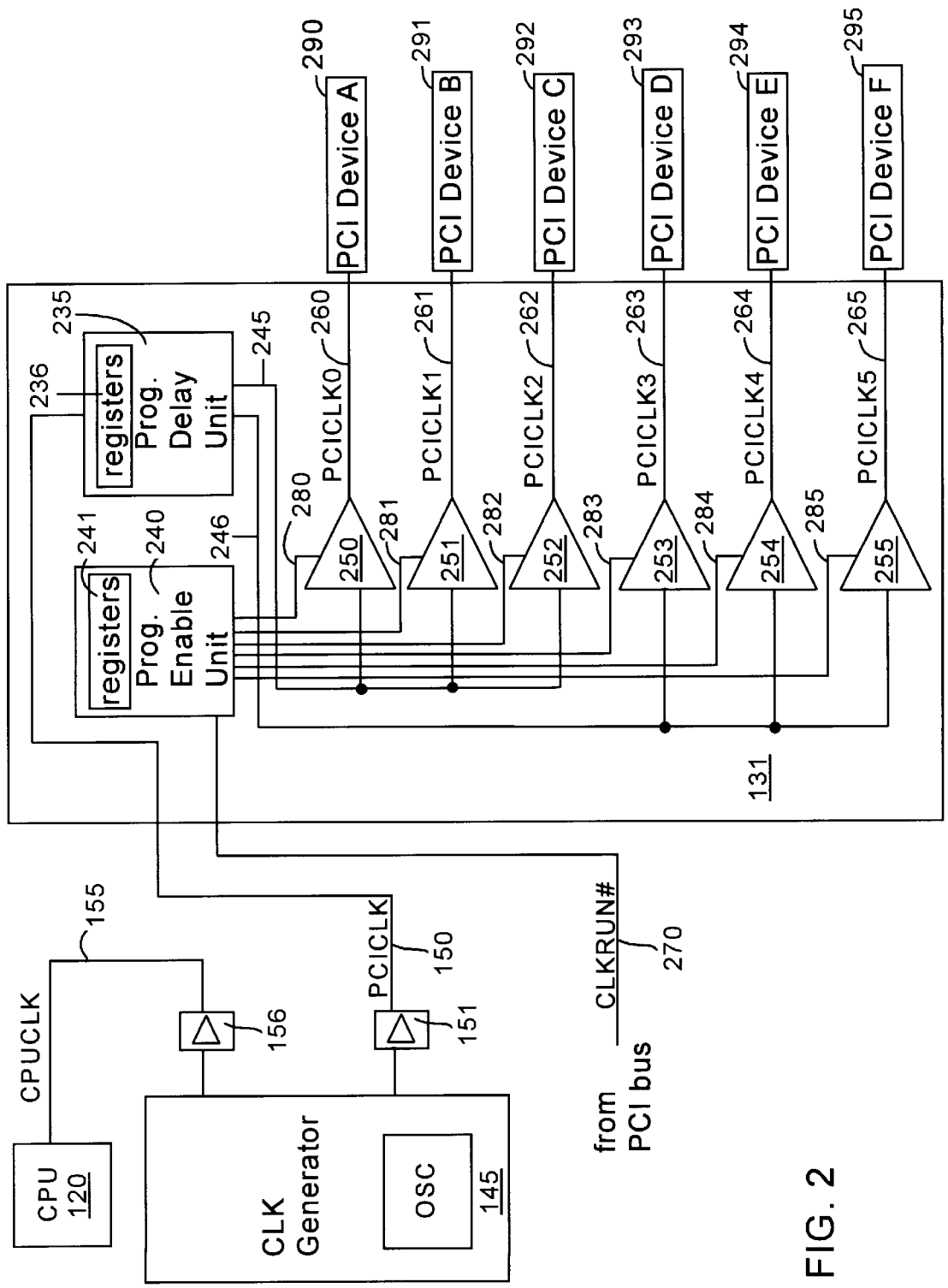
FIG. 2 is a schematic block diagram of a system in accordance with the invention.

Thus, in FIG. 2, a system in accordance with the invention receives a PCICLK signal input 150 from clock generator 145 through buffer 151 and produces multiple synchronous PCICLK output signals, PCICLK0–PCICLK5, on lines 260–265, each of which are received by a separate PCI device, PCI Devices A–F 290–295, respectively. In one embodiment of the invention, PCICLK output signals on lines 260–265 roughly correspond with PCI clock signals 116 of FIG. 1, and PCI Devices A–F 290–295 roughly correspond with devices 185, 186, 187, and 190 of FIG. 1.

Referring again to FIG. 2, PCICLK line 150 is coupled to clock management unit 131. Within clock management unit 131, PCICLK line 150 is coupled to programmable delay unit 235.

Programmable delay unit 235 contains logic for introducing a delay into the production of PCICLK output signals, PCICLK0–PCICLK5 260–265, ensuring that each PCICLK output signal 260–265 can be synchronous to each other and to CPUCLK 155, also produced by clock generator 145.

Further, in various embodiments of the invention, one delay may be programmed for all PCICLK output signals, several individual delays, each corresponding to a different PCICLK output, may be programmed, or several group delays, each corresponding to a group of outputs, may be programmed. In the embodiment shown in FIG. 2, one delay is programmed for a first output group, PCICLK0–PCICLK2, and a second delay is programmed for a second output group, PCICLK3–PCICLK5.

In one embodiment, each delay is programmed in an 8-bit register, e.g., in register bank 236, allowing for a coarse adjustment and a fine adjustment of the delay. An example programmable delay register is shown in Table 1 below:

TABLE 1

| 7 | 6 | 5 | 4 | 3 | 2 | 1 | 0 |
|---|---|---|---|---|---|---|---|
| Re-served | Coarse adjustment: | | | Re-served | Fine adjustment: | | |
| | 000 = no delay | | | | 000 = no delay | | |
| | 001 = (PCICLK period ÷2)+~4ns | | | | 001 = add ~1ns | | |
| | 010 = (PCICLK period ÷2)+~8ns | | | | 010 = add ~2ns | | |
| | 011 = (PCICLK period ÷2)+~12ns | | | | 011 = add ~3ns | | |
| | 100 = (PCICLK period ÷2)+~16ns | | | | 100 = add ~4ns | | |
| | 101 = (PCICLK period ÷2)+~20ns | | | | 101 = add ~5ns | | |
| | 110 = (PCICLK period ÷2)+~24ns | | | | 110 = add ~6ns | | |
| | 111 = (PCICLK period ÷2)+~28ns | | | | 111 = add ~7ns | | |

The resulting delay in one embodiment of the invention for each of the PCICLK signal outputs 260–265 is equivalent to a full PCICLK cycle (for clocking in delay unit 235)

plus a partial PCICLK cycle (the programmed delay). Other embodiments of the invention may have a resulting delay of only a partial clock cycle or of two or more clock cycles. Further, the amount of delay which should be programmed to obtain synchronous clocks will vary from device to device depending on various factors including buffering delay and length of the connection line.

One output from the programmable delay unit 235 is coupled via line 245 to buffer units 250–252 which output PCICLK0–PCICLK2 260–262 to PCI Devices A–C 290–292, respectively. A second output from programmable delay unit 235 is coupled via line 246 to buffer units 253–255 which output PCICLK3–PCICLK5 263–265, to PCI devices D–F 293–295, respectively. Depending on the delays programmed, other embodiments of the invention may have a separate output line to each buffer 250–255 for individual delays for each, one output line to all buffers for one delay for all clocks, or any other grouping of output lines from programmable delay unit 235 to buffers 250–255.

Multiple buffers 250–255 are used to produce multiple PCI clock signals on lines 260–265. As shown, in one embodiment of the invention six PCI clock signals are generated. Other embodiments of the invention may generate more or fewer PCI clock outputs.

PCI 2.1 also specifies a CLKRUN# signal, which is a signal designed to enable system power savings by stopping a clock signal to devices that are inactive. Once CLKRUN# is deasserted (driven high) by a bus controller, any PCI device still requiring a clock signal must reassert CLKRUN# (pull it low) within four clock cycles. If no device reasserts CLKRUN#, PCICLK signals to the devices are stopped. Thus CLKRUN# acts as a polling signal to determine which, if any, devices require a continued clock signal. However, not all devices are designed to support CLKRUN#, which is an optional signal in PCI 2.1. Thus, the system shown in FIG. 2 fully supports devices that support CLKRUN# as well as those that do not support CLKRUN#.

As shown in FIG. 2, CLKRUN# line 270 (from the PCI bus) is input into programmable enable unit 240 in clock management unit 131. The programmable enable unit 240 has access to information about each PCI device, e.g., via programmable registers, including information regarding whether such device is enabled and whether such device will support the CLKRUN# feature of PCI 2.1. For instance, if PCI device A can support CLKRUN# then buffer 250 will be disabled and enabled via line 280 in accordance with the CLKRUN# protocol (i.e., CLKRUN# pulled high and if no PCI device responds with 4 clock cycles to indicate that a device still requires a clock signal, the clocks to those devices will be stopped). However, if PCI Device B cannot support CLKRUN#, then its enable line 281 will not be influenced by the CLKRUN# signal. In other words, even if CLKRUN# is pulled high and no device responds within the predetermined time period, the PCICLK1 signal to Device B will not stop.

In one embodiment of the invention, a register is utilized in programmable enable unit 240 for storing information with respect to each PCI device supplied with a PCICLK signal. Each register indicates for each device whether or not it will be affected by CLKRUN#. Upon receipt of a deasserted (high) CLKRUN# signal for the device response period (e.g., 4 clock cycles), programmable enable unit 240 will inhibit clocks only to those devices indicated in register 241 as being affected by CLKRUN#. PCICLKs to other devices will be continued. Thus, clock management unit 131 can implement a low power mode of operation without affecting devices which require a constant clock.

Moreover, an advantage of a system in accordance with the invention is that in one embodiment, clock management unit 131 can be incorporated within a chipset. Incorporating unit 131 onto a chipset allows for the ability to correct for skews on the PCI clock lines as well as support CLKRUN# functions without the need to introduce bulky external circuitry.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A clock managing apparatus, comprising:

a first clock input for carrying a clock input signal having first clock cycles;

a plurality of clock outputs for carrying a plurality of output clock signals, where each output clock signal in said plurality of output clock signals has cycles which are synchronous with said first clock cycles of said input clock signal; and programmable delay means for receiving said input clock signal and for generating said plurality of output clock signals which are delayed from said input clock signal by at least a programmable delay, where said programmable delay causes each of said plurality of output clock signals to be synchronous with said input clock signal.

2. The apparatus of claim 1, wherein a first one of output clock signals in said plurality of output clock signals is delayed by a first programmable delay and a second one of output clock signals in said plurality of output clock signals is delayed by a second programmable delay.

3. The apparatus of claim 1, wherein at least one of said plurality of clock outputs is for carrying an output clock signal to a PCI device.

4. The apparatus of claim 3, further comprising:

a CLKRUN# input for carrying a CLKRUN# signal;

enable means for selectively blocking at least one of said plurality of output clock signals in response to said CLKRUN# signal.

5. The apparatus of claim 4, wherein said enable means includes means for determining whether a device receiving said CLKRUN# signal is responsive to said CLKRUN# signal.

6. A clock managing apparatus, comprising:

a first clock input for carrying a clock input signal having first clock cycles;

a plurality of clock outputs for carrying a plurality of output clock signals, where each output clock signal in said plurality of output clock signals has cycles which are synchronous with said first clock cycles of said input clock signal;

programmable delay means for receiving said input clock signal and for generating said plurality of output clock signals which are delayed from said input clock signal by at least a programmable delay, where said programmable delay causes each of said plurality of output clock signals to be synchronous with said input clock signal;

a second input for carrying a polling signal indicative of a pending stop-clock condition;

determining means for providing information as to whether any of a plurality of devices is responsive to said polling signal, wherein each of said devices receives a respective one of said plurality of output clock signals; and enable means for selectively blocking selected ones of said plurality of output clock signals in response to said polling signal and said information.

7. A clock managing apparatus, comprising:

a plurality of clock outputs for carrying a respective plurality of output clock signals;

a first input for carrying a polling signal indicative of a pending stop-clock condition;

determining means for providing information as to whether any of a plurality of devices is responsive to said polling signal, wherein each of said devices respectively receives a respective one of said plurality of output clock signals; and enable means for selectively blocking selected ones of said output clock signals in response to said polling signal and said information.

8. The apparatus of claim 7, further comprising:

a first clock input for carrying an input clock signal having first clock cycles;

said plurality of output clock signals having cycles which are synchronous with said first clock cycles of said input clock signal; and programmable delay means for receiving said input clock signal and for generating said plurality of output clock signals which are delayed from said input clock signal by at least a programmable delay, where said programmable delay causes each of said plurality of output clock signals to be synchronous with said input clock signal.

9. A clock managing apparatus, comprising:

a first clock input for carrying a clock input signal having first clock cycles;

a clock delay programmer in communication with said first clock input; and a plurality of clock outputs in communication with said clock delay programmer and for carrying a plurality of output clock signals, where each output clock signal in said plurality of output clock signals has cycles which are delayed from said first clock cycles and are synchronous with said first clock cycles of said input clock signal.

10. The apparatus of claim 9, wherein a first one of output clock signals in said plurality of output clock signals is delayed by a first programmable delay and a second one of output clock signals in said plurality of output clock signals is delayed by a second programmable delay.

11. A clock managing apparatus, comprising:

a CLKRUN# input for carrying a CLKRUN# signal;

a programmable enable unit in communication with said CLKRUN# input; and a plurality of clock outputs in communication with said programmable enable unit and for carrying a respective plurality of output clock signals where selected ones of said plurality of output signals are selectively blocked.

* * * * *